United States Patent [19]
Petersen

[11] 3,922,698
[45] Nov. 25, 1975

[54] DYNAMICALLY COMPENSATED EXPOSURE CONTROL SYSTEM

[75] Inventor: Christian C. Petersen, Westwood, Mass.

[73] Assignee: Polaroid Corporation, Cambridge, Mass.

[22] Filed: Oct. 31, 1974

[21] Appl. No.: 519,410

Related U.S. Application Data

[63] Continuation of Ser. No. 333,341, Feb. 16, 1973, which is a continuation of Ser. No. 245,800, April 21, 1972.

[52] U.S. Cl. ............... 354/235; 354/29; 354/59; 354/247
[51] Int. Cl.² .......................................... G03B 9/40
[58] Field of Search ....... 354/235, 247, 29, 59, 271; 350/269

[56] References Cited
UNITED STATES PATENTS
3,153,135  10/1964  Burmeister ..................... 350/269

*Primary Examiner*—Samuel S. Matthews
*Assistant Examiner*—Russell E. Adams, Jr.
*Attorney, Agent, or Firm*—Edward S. Roman

[57] ABSTRACT

An exposure control system for photographic apparatus of a variety utilizing a solenoid actuated exposure mechanism drive. Consistent dynamic performance for the system is achieved through an arrangement wherein the solenoid is coupled to be operated only against the substantially constant retarding force of a spring, while exposure mechanism movement, with attendant mass-accelerative characteristics, is provided by isolated spring drives.

17 Claims, 6 Drawing Figures

DYNAMICALLY COMPENSATED EXPOSURE CONTROL SYSTEM

RELATED APPLICATIONS

This is a continuation of U.S. patent application Ser. No. 333,341, which in turn is a continuation of U.S. patent application Ser. No. 245,800 filed Apr. 21, 1972.

BACKGROUND OF THE INVENTION

U.S. Pat. No. 3,714,879 described a very thin and compact, yet highly automated photographic camera. Designed to operate in a modified reflex fashion, this automatic camera performs a somewhat involved series of operational events in carrying out a single photographic cycle. For instance, the components of the camera normally assume orientations establishing what may be termed "viewing" mode wherein its shutter is open and an aperture of maximum width is defined. Additionally during this viewing mode, the exposure plane of the camera is blocked by a planar reflexing component. When a start button is depressed, the shutter is fully closed to secure the exposure chamber of the camera and the reflex component is actuated to alter the taking optical path of the camera and unblock the exposure plane to establish what is termed as "exposure" mode of operation. During this mode, the shutter or exposure mechanism defines an interval of exposure following which the shutter is again fully closed and held in that closed orientation to secure the exposure chamber while the components of the camera again are automatically driven into their initial viewing mode orientations. When these orientations are achieved, the power supply of the camera is shut down to terminate the photographic cycle.

As may be noted from the foregoing, the logic required of the shutter mechanism of such a camera is somewhat unusual, inasmuch as the shutter must be normally open to permit viewing and focusing and must remain closed to secure the exposure chamber of the camera during periods of operational mode conversion. An exposure system ideally suited to carry out such logic has been described and claimed in a U.S. Pat. by V. K. Eloranta, entitled "Exposure Control System", No. 3,641,889 issued Feb. 15, 1972. This exposure system is characterized in the use of a tractive electromagnetic device, preferably a solenoid, which is energized for the exposure mechanism blades. Through such an arrangement, the requisite shutter logic is achieved with considerable simplicity. Further, the use of a solenoid driven shutter system allows for the development of dual exposure parameter regulation (aperture and speed) of the exposure value of any given exposure. For instance, following an initial energiziation of the solenoid for mode conversion purposes, it is de-energized to permit the blades of the exposure mechanism to progressively open under spring bias to define a gradually enlarging aperture. An exposure interval is terminated by again energizing the solenoid to rapidly drive the exposure mechanism blades into a closed orientation.

Control of the initial de-energization of the solenoid for purposes of commencing an exposure interval, as subsequent energization of the solenoid to terminate an exposure interval, is carried out by an electronic control circuit which operates in conjunction with a light sensing network arranged to be responsive to the light levels of the scene being photographed.

By attenuating scene lighting witnessed by the light sensing network simutaneously and in correspondence with the manipulation of apertural values over the taking lens of the camera, a requisite input representing instantaneous aperture values is available for the control circuit, thereby permitting the noted two parameter control. Generally, manipulation of the light witnessed by the noted light sensing network is carried out by secondary apertures configured within the exposure mechanism blades and arranged to sweep before a photocell or suitable light detector.

The power supply for the very thin camera noted above is present as a primary battery of a very thin and flat configuration which is packaged within each cassette or disposable container of film. The power capacity of such a battery is necessarily limited to meet the thin and compact design criteria of the camera. A preferred arrangement for the battery and film suppply package is described in U.S. Pat. No. 3,543,662, by I. Erlichman, entitled "Film Cassette Including Battery Power Supply." In addition to having a limited capacity, such batteries may be subject to output power variations as a consequence of their use under more or less unusual photographic conditions. For instance, should the thin camera be used under a variety of temperature conditions, the voltage output levels of the battery may vary concomitantly. Further, should the camera be stored for extended periods of time, available power levels for its control system may diminish as the batteries are utilized beyond their design life span. Of course, such inexpensive power supplies are subject to output variations resulting from statistically cognizable vagaries inherent in any manufacturing process.

Where power variations are present in the drive system of an electromagnetic device such as a solenoid, corresponding variations in dynamic performance will be evidenced. For instance, where a solenoid is configured having an internally disposed plunger or armature which is drawn within an excitation winding during the energization thereof the acceleration of the plunger, as it is drawn within the winding, will vary with variations in voltage input to the solenoid. Should the plunger be directly connected to an actuating element of an exposure mechanism of the type described above, any change in the pull-in characteristic of the solenoid will produce a corresponding change in the closing rate of the exposure mechanism. Conventional design procedures are available to compensate for the particular dynamic characteristics of a given shutter design only if they are repeated consistently. That is, for any given shutter or exposure mechanism design, the dynamic performance must be predictable and consistent. This is particularly the case with the above described solenoid actuated exposure mechanism as it is actuated to block a taking aperture. Any variation from one photographic cycle to another cannot be accommodated for by factory calibration procedures. Accordingly, where solenoid pull-in time variations are encountered due to unaccounted for voltage level variations from a battery power supply, some form of compensation is required to assure consistent dynamic operation of a shutter or exposure mechanism.

SUMMARY OF THE INVENTION

The instant invention provides an exposure control system of a variety including instrumentalities driven by tractive electromagnetic devices such as solenoids. This system is characterized in providing for a consistent and predictable dynamic performance of these instrumentalities.

Consistent dynamic performance for the exposure control system is realized through an arrangement wherein the actuating drive or solenoid of the system is coupled to be operated only against the substantially constant force of a spring bias, while exposure mechanism movement with attendent mass-accelerative characteristics is provided by a spring drive isolated from the spring bias against which the solenoid is driven.

Through the use of a spring load upon the noted solenoid which is isolated from a spring drive serving to close a shutter, the exposure control system enjoys the attributes of consistency and reliability of operation even though the power supply to its solenoid drive may vary in consequence of variations of environmental temperatures, energy drains or the like.

Another feature and object of the invention is to provide an exposure control system for photographic apparatus which includes an exposure mechanism of a variety having at least one blade or element movable between a terminal position blocking a taking aperture and open positions defining a progressive variation of apertures. This exposure mechanism element is coupled with a spring assembly serving to bias it into the noted closed terminal position. Movement imparted to the element by the spring assembly is consistent and repeatable in nature. The spring arrangement of the system additionally serves to bias the exposure mechanism element toward open positions defining progressively varyingg apertural values. Drive means in the form of a solenoid is actuable to load the spring arrangement in a manner isolating the influence of the exposure mechanism blade. With the system the spring arrangement is permitted to drive the exposure mechanism element into its closed terminal position in a manner evidencing consistent dynamic characteristics.

A further object and feature of the inventions to provide an exposure control system for photographic apparatus which includes a light valve which may be present as a two bladed shutter, the blades of which move in correspondence and in synchronizm across a taking aperture to define progressively varying apertural values. The system includes a first drive arrangement present as a spring having a predetermined and consistent force characteristic and which serves to bias the shutter blades to move toward the position fully blocking the aperture of the apparatus. The system further includes a second spring drive arrangement having a force value greater than the first spring arrangement and which is releasable from a loaded condition to urge the blades to move toward a position defining a maximum aperture width. Connector means are provided associating the first and second spring drives such that the second spring loads the first during the noted movement toward the open terminal position. Actuator means in the form of a tractive electromagnetic device are coupled with the second spring drive and serve to reload it at a rate greater than the unloading rate of the first spring drive when the later is operative to move the blades toward their closed terminal position. With the arrangement, movement imparted to the blades is derived solely from spring power sources and such movement is isolated from the device characteristics of the tractive electromagnetic device.

Another object of the invention is to provide an exposure control system for photographic apparatus serving to regulate the passage of scene light through a taking aperture. The system includes an exposure mechanism having at least one element which is movable between a terminal position serving to block the passage of light through the noted aperture and open positions unblocking the aperture. Progressively varying apertural values are defined during movement toward the open position. The system further includes a spring drive arrangement having predetermined force characteristics which selectively moves the exposure mechanism element between the noted terminal and open positions. A flexible connector arrangement is associated in driven relationship with the spring drive arrangement and in driving relationship with the exposure mechanism element when the mechanism moves from its terminal position toward the noted open positions. The flexible connector is isolated from the noted driven relationship when the exposure mechanism element is moved toward the noted blocking terminal position. A tractive electromagnet in the form of a solenoid is provided which is selectively energizable to load the spring arrangement and simultaneously effect the exposure mechanism element movement by the spring arrangement toward and into the noted terminal position. The solenoid is selectively de-energizable to effect the exposure mechanism element movement from the noted terminal position toward the open positions. Additionally, control means are provided for selectively energizing and de-energizing the solenoid to carry out a photographic exposure.

Other objects of the invention will in part be obvious and will in part appear hereinafter.

The invention, accordingly, comprises the system possessing the construction, combination of elements and arrangement of parts which is exemplified in the following detailed disclosure.

For a fuller understanding of the nature and objects of the invention, reference should be had to the following detailed description taken in connection with the accompanying drawings.

DETAILED DESCRIPTION

A principle embodiment for the system of the invention concerns a dual bladed exposure mechanism, the exposure openings within which cooperate to define progressively enlarging aperture widths as the blades are driven toward an unblocking terminal position. Drive for this movement preferably is derived from a spring connected between the blades and a ground. Thus utilized, this spring provides a shutter characteristic wherein the mechanism defines an aperture of maximum available width in its normal or standby condition. Such a normally open aperture status is of significant utility where the mechanism is utilized in conjunction with the above discussed reflex type cameras.

When operated to define an interval of exposure, the noted exposure mechanism blades are released from orientations wherein they fully block the aperture opening, whereupon they move to define progressively varying aperture values until a predetermined exposure value is reached. When this value is reached, a tractive electromagnetic device in the form of a solenoid is energized to terminate the exposure interval by driving the blades to return them to their terminal position blocking the exposure opening. Inasmuch as the exposure mechanism blades define progressively varying apertural values as they are moved toward open positions, the exposure control system is capable of providing dual parameter exposure control as well as operating under the program criteria of an automatic reflex camera.

Figure 1:
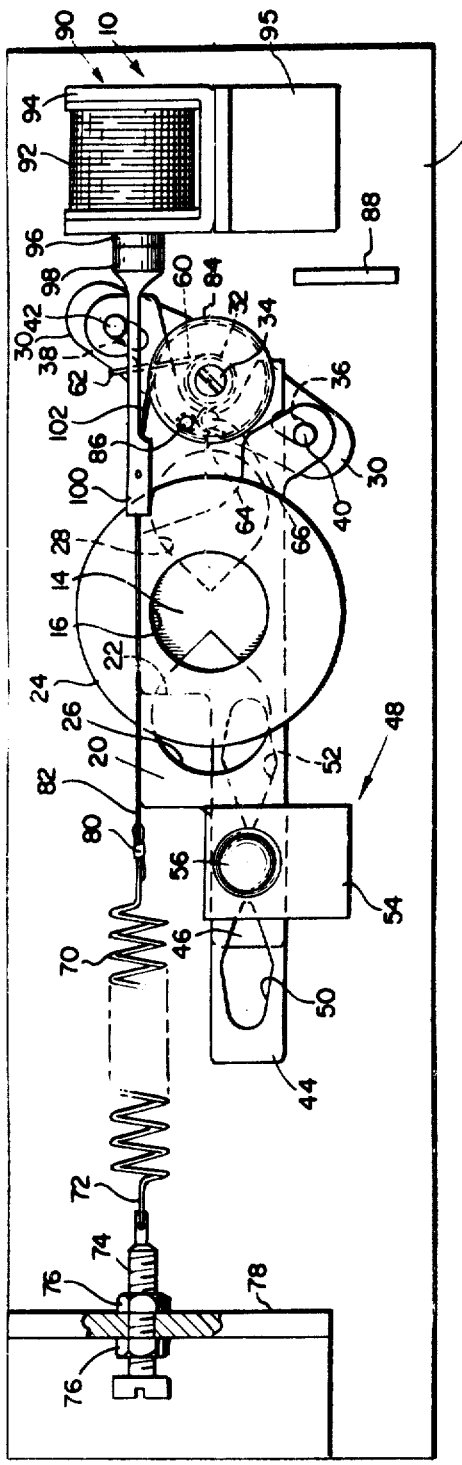
FIG. 1 is a front elevational view of an exposure control mechanism incorporating the features of the instant invention and showing an orientation of components providing for the complete blocking of an exposure aperture.

Referring to FIG. 1, an exposure mechanism embodying the above described operational features is illustrated generally at 10. Mechanism 10 includes a suporting block or base 12 within which is formed an exposure opening or aperture 14. The outermost periphery 16 of opening 14 defines the maximum taking aperture width which mechanism may establish. Two exposure mechanism blades or elements 20 and 22 are present within mechanism 10. These blades are slidably mounted within an annular bracket 24 fixed in turn, to base plate 12. The periphery of the inner opening of bracket 24 is seen to be coextensive with outermost periphery 16 of exposure opening 14.

Blades 20 and 22, respectively, are configured having teardrop shaped openings 26 and 28 formed therewithin. Openings 26 and 28 are positioned within respective blades 20 and 22 in a reversed sense such that as they overlap, they combine to form a symmetrically configured aperture opening.

The symmetry of the aperture openings defined by blades 20 and 22 is provided as a consequence of their mutual connection with a "walking beam" as shown at 30. Walking beam 30 is rotatably mounted upon an upstanding stud 32 extending from base 12 and is secured thereupon by a flat faced screw, or the like, 34. Elongate slots as at 36 and 38 are formed in the outward tip portions of beam 30 for the purpose of providing connection with pins 40 and 42 extending, respectively, from blades 20 and 22. Thus interconnected, blades 20 and 22 may move simultaneously and in correspondence with each other to define symmetrically configured, variable aperture openings of progressively varying value over exposure opening 14. Elongate slots 36 and 38 serve the function of accommodating the horizontally restricted movement of blades 20 and 22 along cords extending through the locus of rotation of the tips of beam 30. In effect beam 30 and blades 20 and 22 serve as a light valve over aperture 14.

Blades 20 and 22 also are configured having elongate portions respectively shown at 44 and 46 which extend through a light detecting station shown generally at 28. Elongate portions 44 and 46, respectively are formed incorporating secondary openings 50 and 52. Openings 50 and 52 are configured in light regulating correspondence with the configuration of respective openings 26 and 28. Serving a photocell sweep function, secondary openings 50 and 52 are oriented within portions 44 and 46 in a mutually reversed sense such that they may move with mutual symmetry and in synchronism with openings 26 and 28. Accordingly, the openings 50 and 52 overlap to define an opening providing regulation of the passage of light from a scene being photographed to the photosensing element or elements of a light sensing network. Such elements are positioned within light detecting station 48 and behind elongate portions 44 and 46. Station 48 additionally includes a bracket 54 which serves to support appropriate entrance optics 56 having a field of view corresponding with that of a taking lens positioned within an optical path defined through opening 14.

Walking beam 30 is biased to urge blades 20 and 22 to move into the terminal light blocking position shown in FIG. 1 by a spirally or helically wound spring 60. Positioned between beam 30 and supporting base 12 and wound about upstanding stud 32, the movable and 62 of spring 60 is formed to abut against beam 30, while its stationary end 64 is grounded by attachment with a pin 66 extending from base 12.

Exposure mechanism 10 also includes a tension spring 70 having one end 72 fixed in grounded fashion to the tip of a tension adjusting screw 74. Tension adjusting screw 74 is threadably connected as by nuts at 76 to the upstanding flange of a bracket 78. Bracket 78, in turn, is fixed to supporting base 12. The movable end of spring 70 is connected at 80 to a flexible connector or cable 82. The opposite end of cable 82 extends about the periphery or winding surface of a drum or sheave 84 to be connected therewith at a pin 86. Drum 84 is fixed to and, therefore, rotatable in correspondence with walking beam 30. Thus connected to cable 82, spring 70 serves to bias walking beam 30 to rotate in a direction urging blades 20 and 22 into orientations defining various aperture openings across exposure opening 14. The maximum extent of rotation of beam 30 in this direction defining open apertures is limited by a stop member 88 extending from base 12.

Base 12 also supports a tractive electromagnetic device present as a solenoid 90 at a location somewhat adjacent wlaking beam 30. Constructed in conventional fashion, solenoid 90 includes an excitation winding 92, a magnetic circuit completing bracket 94 mounted upon base supporting bracket 95 and an internally disposed plunger or armature 96. The outer tip of plunger is coupled to one end of a plastic extention 98, the opposite end of which is connected at 100 to cable 82. Note that the point of connection 100 is spaced before the point of tangency of cable 82 with drum 84. Accordingly, force exerted from spring 70 into the portion 102 of cable 82 extending from connection 100 to pin 86 may be selectively relieved in consequence of a movement of plunger 96. Such relief is realized upon the energization of excitation winding 92 to, in turn, cause plunger 96 to be retracted inwardly into the body of solenoid 90 toward a seated terminal position. FIG.

1 illustrates the orientation of the components of mechanism 10 when excitation winding 92 of solenoid 90 is energized and plunger 96 has been retracted to this seated position. Note in the FIG. that walking beam 30 has been rotated under the bias of spring 60 into a terminal position wherein blades 20 and 22 are oriented to fully block exposure opening 14 as well entrance optics 56 of light detecting station 48.

Figure 2:
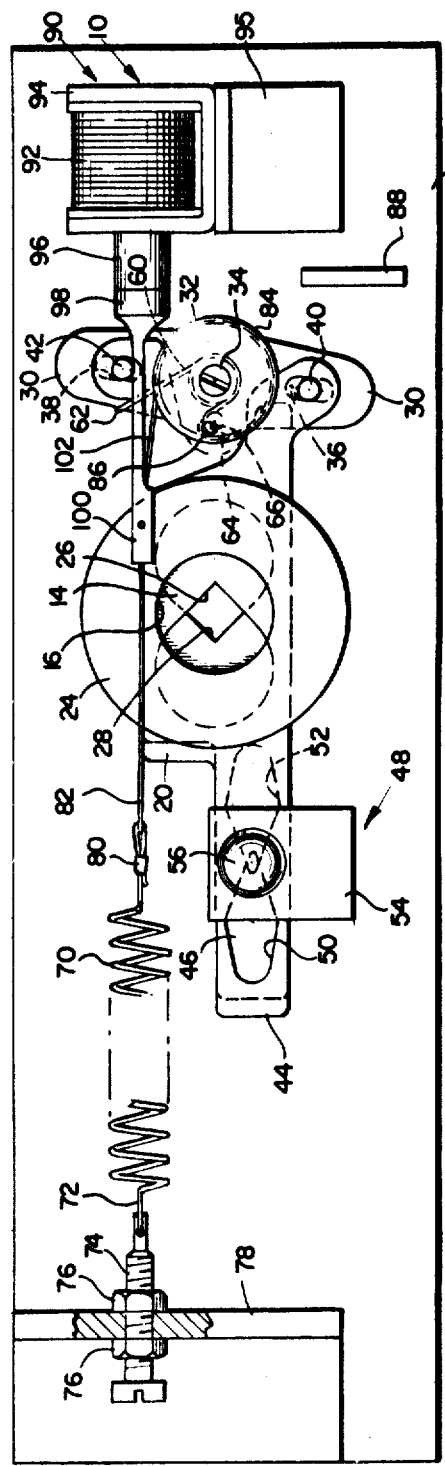
FIG. 2 is a view of the exposure mechanism of FIG. 1 showing the components thereof as they are oriented during an interval of an exposure.

The force or tension exerted by spring 70 through cable 82 and into walking beam 30 through drum 84 is selected as being greater than the counter-rotative force value exerted by closing spring 60. For instance, the force exerted from spring 70 may be selected as about twice that exerted by spring 60. Accordingly, winding 92 of solenoid 90 may be selectively de-energized to commence and an interval of exposure. Upon such de-energization, spring 70 rotates walking beam 30 against the bias of spring 60 to cause blades 20 and 22 to be driven in a manner permitting openings 26 and 28 as well as secondary openings 50 and 52 to define progressively enlarging aperture openings across their respective optical paths at 14 and 56. An intermediate apertural value defined by mechanism 10 during such blade movement is illustrated in FIG. 2. To terminate an interval exposure, winding 92 of solenoid 90 is again energized to cause plunger 96 to be rapidly retracted into its seated position as at FIG. 1. Solenoid 90 is selected having an appropriate power as to accelerate the retracted movement of plunger 96 in a manner relieving the tension influence of spring 70 upon portion 102 of cable 82. As a consequence, walking beam 30 is rotated to its terminal blocking position under the sole influence of closing spring 60, i.e. the drive influence of opening spring 70 is isolated from the closing drive influence of spring 60.

In important applications of the exposure mechanisms as described, the power supply available for energizing solenoid as at 90 will be greatly limited, effecting a concomitant limitation of the size and available power of the solenoid itself. As will be described in detail, the system of the present invention permits optimization of the power available to drive solenoid 90 as well permitting the solenoid 90 to be selected having highly efficient drive characteristic within the system.

Figure 3:
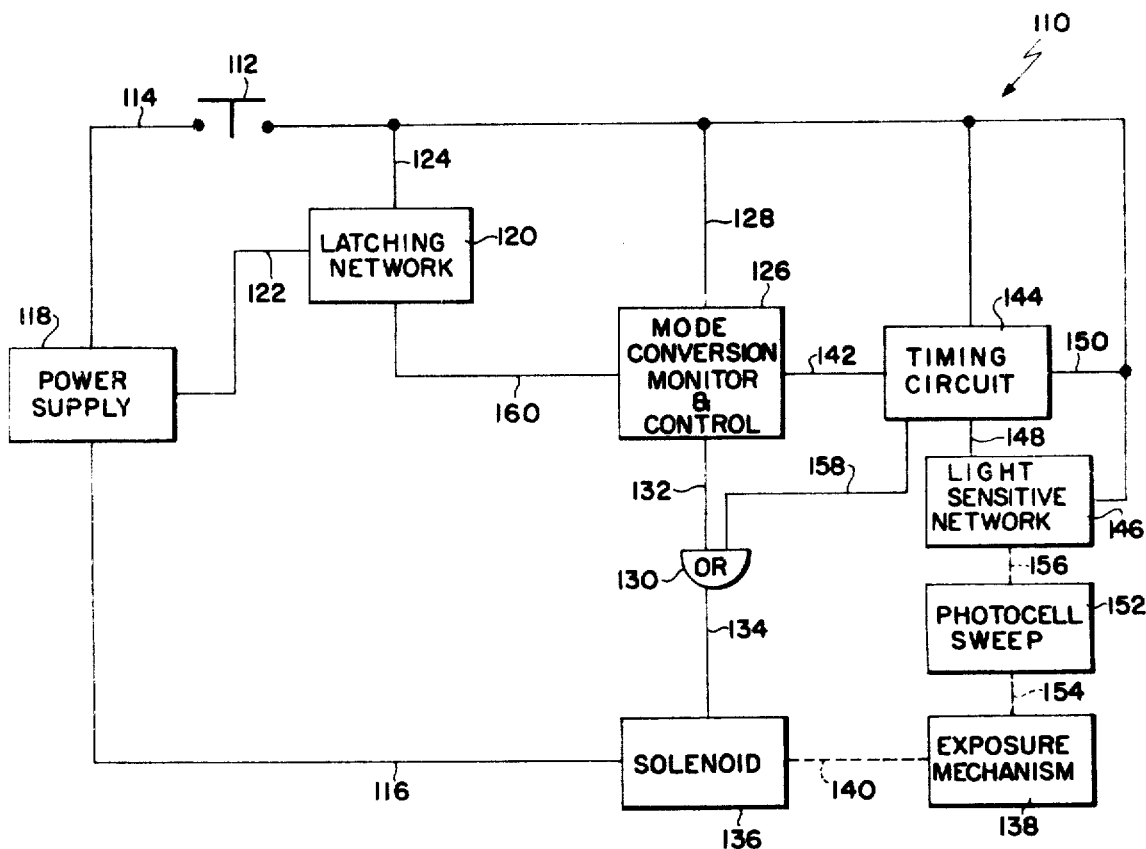
FIG. 3 is a schematic diagram of an electrically powered control circuit for operating the exposure control mechanism of FIGS. 1 and 2.

Referring to FIG. 3, a schematic representation of a control circuit which may be used to operate the mechanism of FIGS. 1 and 2 is illustrated generally at 110. Described in a copending application for U.S. Patent by E. K. Shenk, Ser. No. 134,725, entitled "Reflex Camera With Motor Drive" filed Apr. 16, 1971 and assigned in common herewith, the circuit at 110 is designed for performance with a reflex camera of a variety which converts between viewing and exposure modes in the course of a single photographic cycle. Such a photographic cycle is commenced with the momentary closing of a start switch or button as shown at 112. When closed, switch 112 permits the energization of power distribution lines 114 and 116 from a power supply 118. Power supply 118 may be a primary battery of a highly compact variety suited for packaging within a disposable film cassette. Of course, such power supplies may be subject to minor output variations occasioned from weather conditions or similar vagaries occasioned in use or manufacture. With the erergization of line 114, a latching network 120 is activated. Network 120 is connected with power supply 118 from along line 122 and to power line 114 from along line 124. When activated, latching network 120 serves to effect the continuous energization of circuit 110, thereby permitting switch 112 to be of a variety which is biased to disconnect when actuating pressure is removed therefrom.

Activation of power lines 114 and 116 also serves to energize a mode conversion monitoring and control feature illustrated generally at 126. Monitor and control function 126 is coupled with power line 114 from along line 128 and is connected through line 132 to an OR GATE 130. The output of OR GATE 130 is present at line 134 and is connected to the solenoid of an exposure control mechanism as depicted functionally at 136. Solenoid 136 will be recognized as corresponding with that described in connection with FIGS. 1 and 2 at 90. Accordingly, with the initial energization of lines 114 and 116, mode conversion monitoring control 126 commands OR GATE 130 to energize solenoid 136 to secure the exposure chamber of a photographic camera until such time as the components thereof have converted from a viewing mode orientation to an exposure mode orientation. The mechanical linkage between solenoid 136 and exposure mechanism 138 is shown by dashed line 140. Exposure mechanism 138 will be recognized as that described at 10 in connection with FIGS. 1 and 2, while mechanical linkage 140 may be represented as component 98, connection 100, flexible connector 82, portion 102 thereof and pin 86.

At such time as function 126 has monitored the conversion from a viewing mode to an exposure mode of operation of the apparatus, simultaneous commands are imposed from along lines 132 and 142 to, respectively, cause OR GATE 130 to de-energize solenoid 136 and to activate a light responsive network including a timing circuit 144 and a light sensitive network 146. Connection between timing circuit 144 and network 146 is provided by line 148, while power supply connection between circuit 144 and power line 114 is provided by line 150. As the elements of exposure mechanism 138, for instance blades 20 and 22, are driven towards orientations defining progressively enlarging aperture openings, a mechanically linked photocell sweep function as shown at 152 serves to impart information relating to instantaneous apertural values to the light sensing network 146. The interrelationship between photocell sweep 152, exposure mechanism 138 and light sensitive network 146 is mechanical by nature and, accordingly, is represented by dashed lines shown at 154 and 156. These functions are represented in FIGS. 1 and 2 as elongate portions 44 and 46 of respective exposure mechanism blades 20 and 22 as well as secondary openings 50 and 52. A detailed description of a preferred embodiment for light sensitive network 146 and timing circuit 144 is provided in U.S. Pat. No. 3,620,143 J. P. Burgarella, entitled "Automatic Exposure Control System With Fast Linear Response."

When the exposure control system including timing circuit 144 and light sensitive network 146 determines that a proper exposure valuation has been reached by exposure mechanism 138, a signal is imposed along line 158 to OR GATE 130 commanding the later to again energize solenoid 136 from along line 134. Energization of solenoid 136, as represented in FIGS. 1 and 2, causes exposure mechanism blades 20 and 22 to be rapidly drawn into a fully blocking terminal position. This blocking orientation is maintained until such time as mode conversion monitoring control function 126 again returns the components of the camera to an initial viewing mode orientation. When this orientation is reached, the monitor feature at 126 signals latching network 120 from along line 160 that a photographic cycle is terminated. Upon receipt of such signal, latching network 120 shuts down circuit 110 in preparation for a next succeeding cycle.

Ideally, exposure mechanisms of the general character described should exhibit a consistent dynamic operational performance under reasonably varying power inputs to their drive solenoids. Without such consistency the control systems cannot be adjusted practically for operation under varying levels of scene brightness. Returning to FIGS. 1 and 2, it may be observed that the drive forces imparted to walking beam 30 and interconnected blades 20 and 22 are derived in isolation from the drive forces asserted by solenoid 90. The mechanical arrangement deriving this feature at the electromechanical interface of the system permits the noted requisite consistency of operation. For instance, opening movement of blades 20 and 22 is derived solely from forces generated through spring 70. The opening forces generate in spring 70, as imposed through cable 82 to drum 84 and walking beam 30, must overcome the mass accellerative and frictional force values of substantially all moving components within mechanism 10 as well as the consistent returning force exhibited by closing spring 60. Inasmuch as such drive springs as at 70 are readily selectable to exhibit consistently repeatable pulling force values, the dynamic opening movement characteristics of mechanism 10 correspondingly are statistically repeatable. Accordingly, the exposure control system may be designed to be properly responsive to the opening characteristic of mechanism 10.

Closing movement of exposure mechanism blades 20 and 22 is effected in consequence of the movement of plunger 97 to its retracted position within excitation winding 92 of solenoid 90. Although solenoid 90 may be designed to exhibit reasonably consistent dynamic characteristics, its performance will vary in correspondence with variations in power supplied to it. The control system of the present invention accommodates for such variations. Note, in particular, that as plunger 96 is retracted within excitation winding 92, portion 102 of cable 82 effectively is slackened, thereby permitting all closing motion imparted to walking beam 30 and blades 20 and 22 to be derived from closing spring 60. Accordingly, the mass-accellerative and frictional force values imposed from blades 20 and 22 as well as walking beam 30 are overcome solely by the closing force of spring 60.

A further aspect of the closing operation of mechanism 10 resides in the somewhat unique loading of solenoid 90 during the retraction of plunger 96. Inasmuch as all closing forces assigned the task of overcoming of mass-accellerative and frictional force characteristics of mechanism 10 are derived from closing spring 60, the characteristic of the load imposed upon solenoid 90 is one of substantially pure force value. This force value is represented by the retracting force exhibited by spring 70 and the somewhat dismissable retarding effects exhibited by the small mass of plunger 96. With such separation of work performed by solenoid 90 from the retarding characteristics of the exposure mechanism, a much more efficient solenoid design is available. For instance, required load variations establishing design criteria may fall within a much narrower range inasmuch as the loading imposed upon solenoid 90 are predictable with considerable accuracy.

Should the noted isolation of solenoid 90 from the retarding characteristics of mechanism 10 not to be present, the solenoid would be called upon to exert a closing force vector upon blades 20 and 22 as well as beam 30 and accellerate the combination to move in a closing direction. This closing movement must be consistently repeatable for any given light level. A particularly critical phase of such operation would be present at light levels wherein less than a full aperture opening is defined by blade openings 26 and 28. Under such circumstances, solenoid 90 would be called upon to operate within what may be termed a "flying system" wherein the mass-accellerative force characteristics of the mechanism are of higher values. Any alteration of power level inputs to solenoid 90 during such operation would result in unacceptable inconsistencies of performance.

Figure 4:
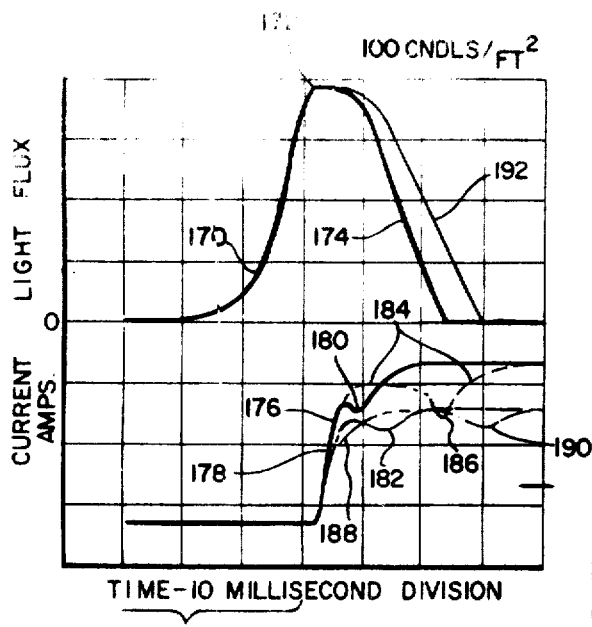
FIG. 4 is a representation of a family of oscillotrace curves, the upper ones of which represent light flux from a 100 cdls/ft.$^2$ source passing the aperture of the mechanism of FIG. 1 and the lower curves of which represent corresponding current levels evidenced at the excitation winding of a drive solenoid of the mechanism.

Turning to FIG. 4, the operation of a mechanism as at 10 and attendant control system is analyzed. The curves of FIG. 4 are representative of oscillotraces derived in testing a mechanism as at 10. Curve 170 represents the voltage equivalent of light flux values witnessed at exposure opening 14 as such values are generated from a light source of 100 cdls/ft.$^2$ intensity and under a predetermined "command time" of about 30 milliseconds. The term "command time" is considered to represent an interval of time between the de-energization of solenoid 90, commencing an interval of exposure, and the subsequent energization of solenoid 90, terminating an exposure interval. The peak or inflexion point at 172 of curve 170 is representative of the attainment by the components of mechanism 10 of a fully open aperture, while the trailing portion of the curve, at 174, represents the closing characteristic of mechanism 10 under the conditions described. The lower traces in evidence in FIG. 4, as at 176 and 178, represent current values within the excitation winding 90 of solenoid 90 during two energizations thereof deriving curve 170. It follows, that curve 170 represents two overlapping traces. Note that energization of a solenoid winding 92 commences at the termination of the labled command time and that current levels rise rapidly to a peak, whereupon they drop to form depressions as at 180 and 182. This current depression represents the attainment by plunger 92 of its fully seated position, the inductive characteristics of solenoid 90 being responsible for the marked current drop. The difference in amplitudes between curves 176 and 178 represents a two-to-one change in power introduced to winding 92 of solenoid 90. Even though such a power variation was imposed upon solenoid 90, the resultant exposure traces, as represented curve 170, essentially overlap. In particular, the performance of exposure mechanism 10 for the noted traces at 170 represents a 0.02 F stop error.

Should the isolating system and mechanism as in 10 not be utilized under the same test conditions, and if the solenoid is required to carry out closing performance through direct connection to the exposure mechanism blades and the like, error will result under different power loadings to the solenoid. For instance, curve 184 is representative of a current trace for the winding of a solenid directly coupled to an exposure mechanism of the general type described. As before, curve 184 evidences a depression at 186 representing a full seating of a plunger of such a solenoid. The resultant exposure trace is identical to curve 170 and exposure is shown to be terminated in conjunction with the full seating of the plunger of the solenoid as at 186. Should the level of power introduced to such solenoid be dropped, for instance on a two-to-one basis, a lower current trace as at 188 will be developed and seating of the solenoid plunger will take place as evidenced at depression 190. The corresponding exposure trace during such closing activity as at curve 188 may be represented by curve 192. Note the considerable exposure error evidenced between closing trace 174 corresponding with excitation curve 184 and closing trace 192 representing operation under lower power levels as evidenced at curve 188.

Figure 5:
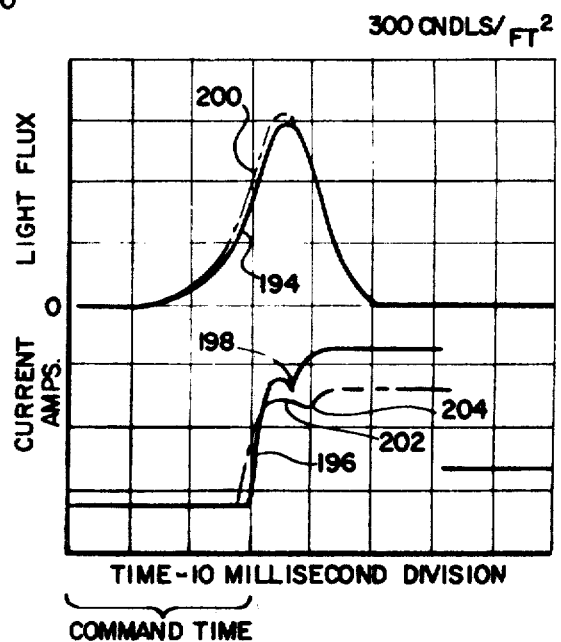
FIG. 5 is a reproduction of a family of oscillo-trace curves similar to those shown in FIG. 4 but derived under a light source intensity of 300 cdls/ft.$^2$.

FIG. 5 represents oscillotraces derived from operating a mechanism as at 10 in similar fashion as described in connection with FIG. 4, however, using a light source intensity selected at 300 cdls/ft.$^2$. As evidenced by exposure trace curve 194, a shorter command time is present in the exposure and blades 20 and 22 define an intermediate apertural value, the blades not reaching their fully open orientation. Under such conditions, force values including decelleration effects must be overcome by the exposure system while achieving requisite consistency of performance. Current trace 196 along with its attendent depression at 198 showing plunger seating represents performance of the system under optimum voltage or power levels. Trace 200 along with corresponding current trace 202 shows operation of the system under a two-to-one lowering in power supply to solenoid 90. Note that depression 204 is evidenced or appears at a slightly later time than depression 198 at a higher voltage level. However, the depression at 204 evidences that plunger 96 was fully retracted in sufficient time to maintain the isolation of the drive characteristics of closing spring 60. A comparison of the integrated values of curves 194 and 200 indicates an error between the two exposures amounting to 0.13 F stops. This error is within acceptable limits for such an exposure system.

Figure 6:
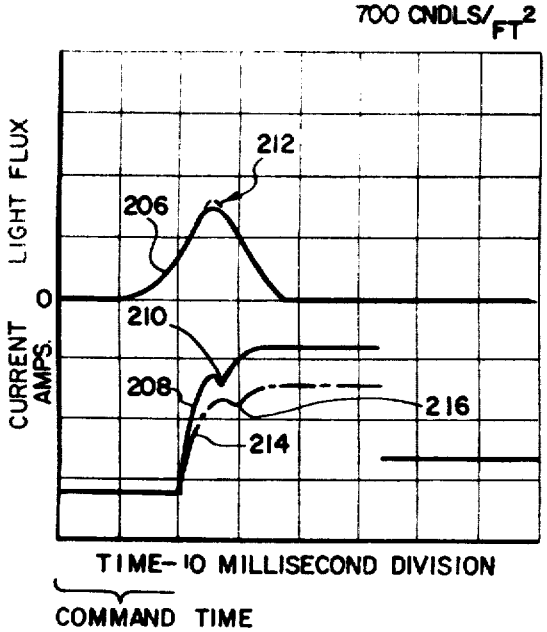
FIG. 6 is a reproduction of a family of oscillo-trace curves similar to those in FIG. 5 only derived in conjunction with a light source intensity of 700 cdls/ft.$^2$.

FIG. 6 shows a family of oscillotraces derived in identical fashion to those derived in FIG. 5 only under a light source level of 700 cdls/ft.$^2$. Again, exposure mechanism 10 is operated under "flying conditions" wherein the moving components of the mechanism are arrested and their opening motion reversed a short period of time following the commencement of the exposure interval. As before, this period of time is labeled "command time" in the figure. When operated under optimum power levels, the exposure control system derives the exposure trace shown at curve 206. The corresponding current trace of excitation winding 92 is evidenced at 208 and the current depression representing full seating of plugner 96 is shown at 210. For a two-to-one lowering of input power to solenoid 90, an exposure trace as at 212 is witnessed. The corresponding current trace for winding 92 of solenoid 90 is shown at 214, while the depression therein representing full seating of plunger 96 is shown at 216. As before, current depression 216 lags that at 210 to evidence a slightly altered dynamic performance of solenoid 90. However, the seating of plunger 96 is rapid enough or under adequate dynamic characteristics to achieve requisite consistency in performance under the noted power level change. In the oscillotrace shown in FIG. 6, the error between curves 206 and 212 amounts to 0.16 F stops, an acceptable value.

Since certain changes may be made in the above described photographic apparatus and system without departing from the scope of the invention herein involved, it is intended that all matter contained in the above description or shown in the accompanying drawings shall be interpreted as illustrative and not in a limiting sense.

What is claimed is:

1. An exposure control system for photographic apparatus comprising:

exposure mechanism means selectively movable in a first direction toward a first terminal position and in a second direction toward a second terminal position to control light passage through an exposure aperture;

spring means normally operative to exert force against said exposure mechanism so as to move said exposure mechanism in said first direction toward said first terminal position, said spring means being actuable to exert force against said exposure mechanism so as to move said exposure mechanism in said second position toward said second terminal position; and means responsive to an electrical energy input to actuate said spring means such that said spring means moves said exposure mechanism in said second direction toward said second terminal position.

2. The exposure control system of claim 1 wherein said spring means include first spring means biasing said exposure mechanism means to move in said first direction toward said first terminal position; and second spring means biasing said exposure mechanism means to move in said second direction toward said second terminal position and said first spring means being effective when said electrical energy input is removed from said means for actuating said spring means to move said exposure mechanism in said first direction against the bias exerted by said second spring means, the application of said electrical energy input to said means for actuating said spring means being effective to remove the influence of said first spring means from said exposure mechanism means so as to permit said exposure mechanism means movement in said second direction toward said second terminal position by said second spring means bias.

3. The exposure control system of claim 2 in which said means for actuating said spring means is configured to load said first spring means at an accelerative rate selected to negate the influence thereof upon said exposure mechanism means movement in said second direction toward said second terminal position.

4. The exposure control system of claim 3 in which said exposure mechanism means is configured to progressively unblock said exposure aperture when moved in said first direction and to progressively block said exposure aperture when moved in said second direction.

5. An exposure control mechanism for photographic apparatus comprising:

exposure mechanism means movable in first and second directions to control light passage through an exposure aperture;

tractive eletromagnetic means including an excitation winding and a movable armature, said armature being movable in one direction upon energization of said excitation winding;

first spring means biasing said exposure mechanism means to move in said first direction; and second spring means biasing said movable armature in a second direction and being effective when said winding is unenergized to move said exposure mechanism in said second direction against the said bias exerted by said first spring means, the energization of said winding being effective to remove the influence of said second spring means from said first spring means so as to permit said exposure mechanism means movement in said first direction only by said first spring means bias.

6. The exposure control mechanism of claim 5 in which said tractive electromagnetic means is operative to load said second spring means when said winding is energized.

7. The exposure control mechanism of claim 6 in which said tractive electromagnetic means is configured to load said second spring means at an accelerative rate selected to negate the influence thereof upon said exposure mechanism means movement in said first direction.

8. The exposure control mechanism of claim 7 in which said exposure mechanism means is configured to progressively unblock said exposure aperture when moved in said second direction, and to block said light passage when moved in said first direction.

9. The exposure control mechanism of claim 8 in which said second spring means is connected with said armature for selective loading thereby, and is connected in negatable driving relationship with said exposure mechanism means.

10. The exposure control mechanism of claim 9 in which said first spring means is connected in driving relationship with said exposure mechanism means.

11. An exposure control mechanism for photographic apparatus comprising:
    shutter means movable between first and second positions to control the light permitted to pass through an exposure aperture;
    tractive electromagnetic means including an excitation winding and a movable armature, said armature being movable in one direction upon excitation of said excitation winding;
    first spring means biasing said shutter means toward said first position; and
    second spring means biasing said movable armature in a second direction and also being effective, when said excitation winding is unenergized, to force said shutter means into said second position against the bias provided by said first spring means, the energization of said winding being effective rapidly to remove the influence of said second spring means from said shutter means thereby permitting said first spring means to move said shutter means to said first position, the de-energization of said winding resulting in the return of said shutter means to said second position under the net influence of said first and second spring means.

12. The exposure control mechanism of claim 11 in which said shutter means is configured to block the passage of said light through said aperture when at said first position, and to permit said light passage when at said second position.

13. An exposure control system for photographic apparatus comprising:
    light valve means selectively movable to block and unblock an exposure aperture;
    spring means having first characteristic force values for biasing said valve means for movement to block said exposure aperture, and having second characteristic force values for biasing said valve means for movement to unblock said exposure aperture;
    tractive electromagnetic means energizable to drive only said spring means against said second characteristic force value bias, and de-energizable for effecting said valve means movement under said second characteristic force value bias; and
    control means for selectively energizing and de-energizing said tractive electromagnetic means.

14. The exposure control system of claim 13 in which said spring means second characteristic force values are higher than said first characteristic force values.

15. The exposure control system of claim 14 in which said spring means includes means isolating said second force values from said first force values when said tractive electromagnetic means is energized.

16. The exposure control system of claim 15 in which said spring means includes:
    first spring means cooperating with said valve means and exhibiting said second characteristic force values; and
    second spring means cooperating with said valve means and exhibiting said second characteristic force values.

17. The exposure control system of claim 16 in which said spring means includes means associating said first spring means in driven relationship with said second spring means when said tractive electromagnetic means is de-energized.

* * * * *